Oct. 6, 1925.

C. S. MESERVEY

RIM

Filed Jan. 30, 1924

C. S. Meservey.
INVENTOR

BY Victor J. Evans.
ATTORNEY

WITNESS:

Oct. 6, 1925.

C. S. MESERVEY

RIM

Filed Jan. 30, 1924

C. S. Meservey.
INVENTOR

BY Victor J. Evans.
ATTORNEY

WITNESS:

Patented Oct. 6, 1925.

1,556,536

UNITED STATES PATENT OFFICE.

CHARLES S. MESERVEY, OF BANGOR, MAINE.

RIM.

Application filed January 30, 1924. Serial No. 689,477.

*To all whom it may concern:*

Be it known that I, CHARLES S. MESERVEY, a citizen of the United States, residing at Bangor, in the county of Penobscot and State of Maine, have invented new and useful Improvements in Rims, of which the following is a specification.

This invention relates to demountable tire carrying rims for vehicle wheels, and has particular reference to a means for securing the rim fixed upon the wheel, and which means is so designed to permit of the rim being quickly removed from or associated with the wheel as the occasion may require.

More specifically stated, the invention embodies amongst other features a socket member carried by the rim, and which member is adapted to receive the offset terminal of a headed element passed transversely through the felly of the wheel when the rim is positioned upon the wheel for use, and also embodies cooperating means carried by the rim and felly to hold the parts immovably associated.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
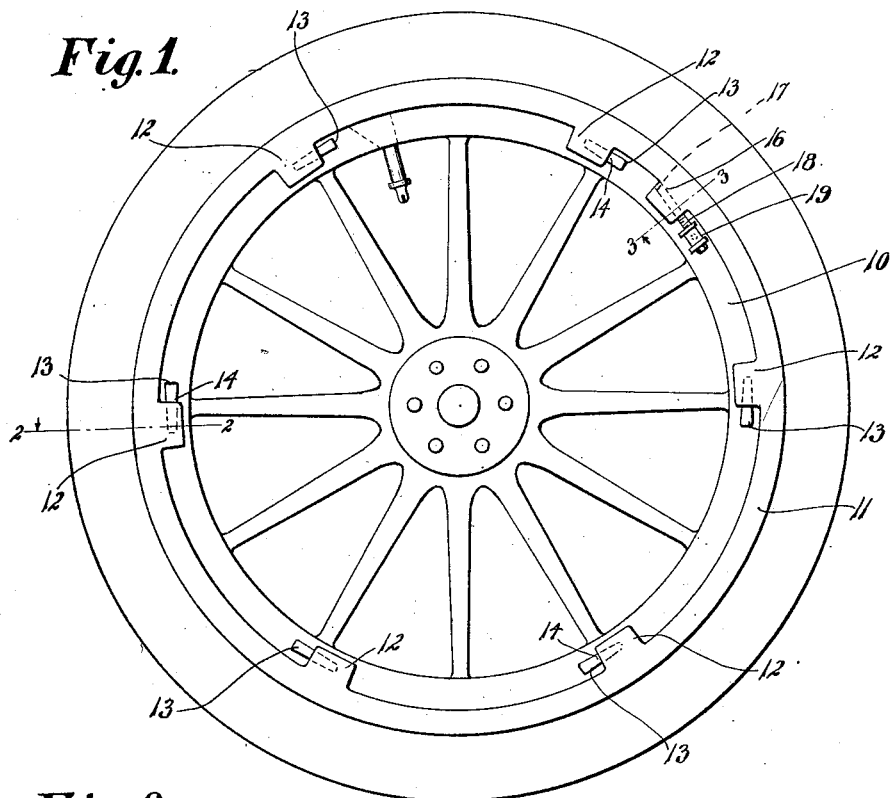
Figure 1 is a side elevation of a wheel showing the manner of supporting the tire carrying rim thereon.
Figure 2:
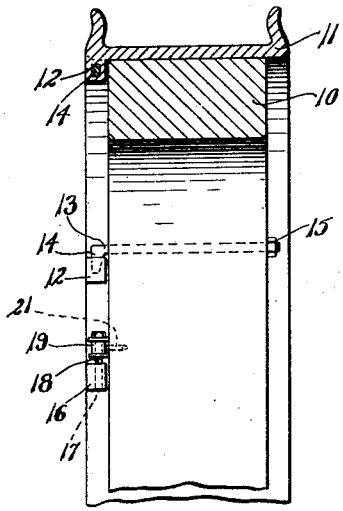
Figure 2 is an enlarged sectional view taken on the line 2—2 of Figure 1.
Figure 3:
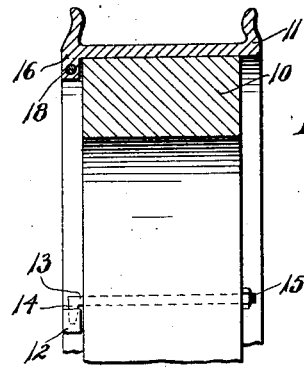
Figure 3 is a similar view taken on the line 3—3 of Figure 1.
Figure 4:
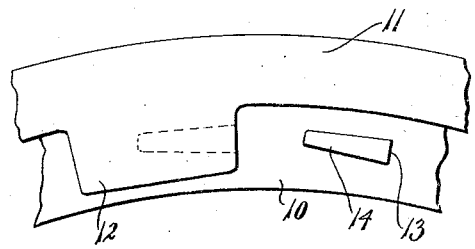
Figure 4 is a fragmentary view of the rim and felly of the wheel showing the relation of the socket member with respect to the offset extremity of the bolt prior to the association of these parts.
Figure 5:
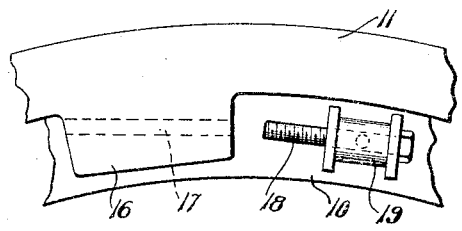
Figure 5 is a similar view showing the component parts of the fastening means separated.
Figure 6:
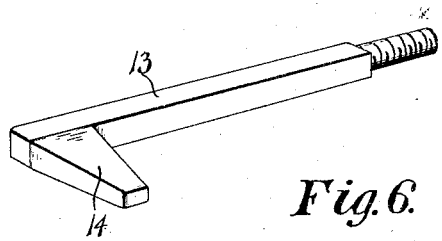
Figure 6 is a detail view of the said bolt.
Figure 7:
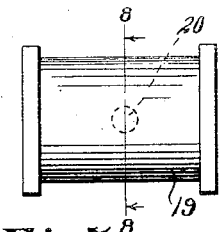
Figure 7 is a detail view of the sleeve forming part of the fastening means.

Referring to the drawings in detail, 10 indicates the felly of a vehicle wheel of well known construction, and 11 the tire carrying rim. For the purpose of holding the rim 11 mounted upon the felly of the wheel for use, and at the same time make it comparatively easy to assemble the rim with the wheel or remove the rim therefrom, I provide the rim 11 with a plurality of socket members 12 to cooperate with bolts 13 carried by the wheel proper. From an inspection of the drawing, it will be noted that the socket members 12 projects from the rim to lie at one side of the felly 10, and forms an integral part of the rim 11. It is of course to be understood that these socket members may be made separate from the rim 11, in which instance they can be secured to the rim by any suitable fastening means. Furthermore the socket members are so disposed that they receive the offset extremity 14 on each of the bolts 13 when the rim is moved circumferentially about the felly incident to the proper association of the rim 11 with the wheel. The bolts 13 are passed transversely through the wheel, the bolts being equipped with nuts 15 which bear against one side of the wheel, while the other ends of the bolts are offset as at 14 and are adapted to extend in the direction of the socket members 12.

Figure 9:
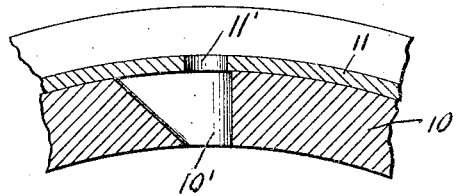
Figure 9 is a fragmentary sectional view of the rim and felly.
Figure 8:
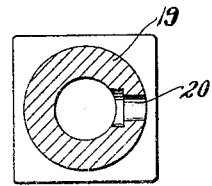
Figure 8 is a view taken on the line 8—8 of Figure 7.

The invention further contemplates the provision of what is termed a fastening means to prevent casual separation of the bolts from the socket members under any conditions, and this fastening means embodies an additional socket member 16 which projects from the rim 11 and arranged with relation to the felly 10 in substantially the same manner as the socket members 12 above described. The bore 17 of the socket 16 is threaded to accommodate a bolt 18 of ordinary well known construction, the bolt being supported at one side of the felly 10 by means of a sleeve like member 19 through which the bolt 18 is loosely passed. This sleeve like member 19 is provided with a transverse opening 20 to receive a fastening element 21 utilized to secure the sleeve like member to one side of the wheel. These parts are so positioned relatively, that when the rim 11 is placed upon the felly of the wheel and moved circumferentially thereon for the purpose of properly positioning the rim on the felly and also positioning the offset extremity 14 of the bolts 13 within the socket members 12, the bolt 18 is arranged in proper alignment with the socket member 16, so that by turning the bolt 18, the latter is effectively screwed into the socket member 16 and thus holds the rim immovably positioned upon the wheel. When it is necessary to change a tire or remove the rim 11 from the felly for any purpose whatsoever, loosening the bolt 18 from the socket member 16 allows the rim to be reversely moved about the felly circumferentially thereof to disengage the offset extremity 14 of the bolt 13 from the socket members 12, whereupon the rim can be easily lifted from the wheel. As shown in Figure 9, the felly 10 and rim 11 are provided with coinciding openings 10' and 11' through which the tire inflating valve is adapted to pass in assembling the tire with the rim.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

The combination with a wheel felly and a rim removably mounted thereon, of a plurality of inwardly directed socket elements carried by the rim and disposed parallel to one of the vertical faces of the felly, a plurality of bolts passing transversely through the felly, tapered right angularly extending heads carried by the bolts and engaged in the socket members, an element also carried by the rim and provided with a longitudinally extending threaded bore, a sleeve carried by the felly, a screw rotatably supported in the sleeve and adapted to have threaded engagement with the bore whereby to hold the rim against circumferential movement.

In testimony whereof I affix my signature.

CHARLES S. MESERVEY.